United States Patent Office 3,304,335
Patented Feb. 14, 1967

3,304,335
PREPARATION OF HALODIFLUORO-
NITROSOMETHANE
Marvin M. Fein, Westfield, and John E. Paustian, Whippany, N.J., assignors to Thiokol Chemical Corporation, Bristol, Pa., a corporation of Delaware
No Drawing. Filed Aug. 13, 1965, Ser. No. 479,611
2 Claims. (Cl. 260—647)

This invention concerns the preparation of halogenated intermediates useful for the preparation of nitroso polymers.

More particularly, this invention relates to the preparation of trihalonitrosomethanes which can be polymerized to nitroso type polymers.

Nitroso rubbers have become of considerable interest in recent years as gum stock for the preparation of specialized rubbers, resins and films. The reasons for this interest are the general chemical inertness of the polymers, as well as their favorable physical characteristics at low temperatures. For example nitroso elastomers are the only elastomers known to be resistant to halogenated oxidizers such as chlorine trifluoride ($ClF_3$) and they retain most of the tensile strength and elasticity even at extremely low temperatures. In addition the nitroso gums are nonflammable and compatible with various fillers and curing systems.

One of the major problems in scaling up nitroso rubber production has been the dearth of relatively inexpensive intermediates which can be prepared in good yield from commercially available starting materials.

A group of attractive intermediates for nitroso polymerization are the halodifluoronitrosomethanes. Especially useful as a reactant is chlorodifluoronitrosomethane. Unfortunately present day processes for preparing this intermediate are tedious and the yields are poor. Thus an improved process for making this intermediate would be a major advance in nitroso polymer art.

Thus it is an object of this invention to prepare halodifluoronitrosomethanes such as chlorodifluoronitrosomethane and its bromine and fluorine analogues.

A more specific object of this invention is to prepare the above compound in good yield from commercially available starting materials.

Additional objects will become obvious after a further reading of this application.

In practice, a halodifluoronitrosomethane is prepared by heating a metal salt of a halodifluoroacetic acid in a suitable liquid medium until thermal decomposition occurs. Then the second reactant, a nitrosyl halide such as nitrosyl chloride or nitrosyl bromide is contacted with the thermal decomposition products until the halodifluoronitrosomethane is formed. When analytical techniques indicate that substantial quantities of the halodifluoronitrosomethane product has been formed, the product is removed and further purified. Purification can be effected by a variety of techniques including vacuum distillation, solvent extraction, and the use of gas phase chromatography.

In the preferred process embodiment a reaction vessel having a heated reaction zone is utilized. In this reaction zone, decomposition of the salt reactant takes place and the decomposition products are contacted with a stoichiometric excess of the nitrosyl halide until the product is formed in significant quantities. In the preferred embodiment the sodium salt of chlorodifluoroacetic acid is decomposed and the decomposition products contacted with nitrosyl chloride. The temperature range favored for decomposition is between 85 and 160° C. with the best results having been obtained over the somewhat narrower range of 140 to 148° C. The thermal decomposition of the salts can be accomplished without the aid of inert solvent but reactant contact is less efficient and yields suffer. For these reasons the preferred practice is to use an inert solvent, boiling above these reaction temperatures. A favored group of solvents are the dialkyl ethers of dialkylene glycols. Especially favored is the lower dialkyl ether of diethylene glycol such as the dimethyl or diethyl ethers of diethylene glycol. Ordinarily no significant advantage accrues through the use of a pressurized or sub-pressurized system and for this reason near atmospheric pressures are favored.

The reaction time is a variable dependent largely upon the reaction temperature utilized and the batch size. Within the favored temperature range of about 140 to 148° C. and when relatively small quantities (less than 100 g. quantities) of reactants are used, the reaction is substantially complete within 4 hours.

At lower temperatures substantially longer reaction times are required. A good indication of the completion of the first stage of the reaction is the formation of salt and the evolution of $CO_2$ gas. These by-products can be monitored visually or by automatic analytical gas analysis techniques. While the success of the inventive process is not dependent or postulated upon any particular reaction mechanism the following reaction involving the generation of difluorocarbene is currently believed to take place.

(1) 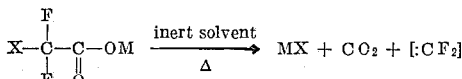

(2) 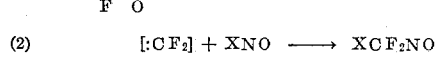

wherein M is a metal selected from the group consisting of the alkali metals and the alkaline earth metals, and X is a halogen, preferably chlorine.

As indicated by the above equations numerous variations of the inventive process are possible. The following represent illustrative embodiments.

A 10 parts by weight portion of potassium chlorodifluoroacetate is placed into an appropriate reaction vessel equipped with heating, cooling and stirring means, a cooled trap and a means for introducing a gaseous reactant. A 40 parts by weight portion of the diethyl ether of diethylene glycol is added and the stirred mixture heated to about 175° C. and a flow of nitrosyl chloride (ClNO) gas is fed into the reactor continuously over a period of several hours. Potassium chloride formation is observed and a green material is collected in the trap as a condensate. Infrared analysis of the sample confirmed the presence of a substantial amount of $ClCF_2NO$ product.

In related embodiments the same procedure described above is followed except that in one instance FNO gas is used as the nitrosyl halide reactant, and in the second instance BrNO is used as the nitrosyl halide reactant.

In another process embodiment a 10 parts by weight portion of $ClCF_2CO_2Na$ and a 40 parts by weight portion of the dimethyl ether of diethylene glycol solvent are mixed in, heated in an appropriate reactor to a temperature of about 160° C. During this time nitrosyl bromide gas is passed in and recycled. Analysis of the condensate after about 6 hours confirms the presence of a substantial amount of the $BrCF_2NO$ product.

As indicated earlier the above process is advantageous in several respects. For example, reaction conditions such as time, temperature, solvents and reactants can be varied. In addition the starting materials are commercially available materials and the products are obtained in a comparatively pure state.

To illustrate the inventive process in its preferred embodiment, the following example is submitted.

EXAMPLE 1.—PREPARATION OF $ClCF_2NO$ FROM SODIUM CHLORODIFLUOROACETATE

To an appropriately sized reactor equipped as described before is added 7.3 parts by weight of the sodium salt of chlorodifluoroacetate, and 27 parts by weight of the dimethyl ether of diethylene glycol. The mixture is heated to about 148° C. over a period of 2 hours with a concurrent flow of ClNO gas into the reactor. At 80° C., solid formation indicative of NaCl is noted; at 142° C., a green material is observed in the chilled condenser. After the reaction is stopped, the green product is collected in a trap cooled by liquid nitrogen. Infrared analysis confirms the identity of the product as $ClCF_2NO$.

The above example and embodiments are not to be construed as defining the limits of this invention. The metes and bounds of this invention are best defined by the claims which follow.

What is claimed is:

1. A process for preparing chlorodifluoronitrosomethane comprising reacting nitroso chloride with sodium chlorodifluoroacetate at a temperature between about 85° C. and 160° C., and recovering said chlorodifluoronitrosomethane.

2. A process in accordance with claim 1 wherein said nitroso chloride and sodium chlorodifluoroacetate are reacted together in the presence of an inert solvent.

References Cited by the Examiner

UNITED STATES PATENTS 3,213,009    10/1965    Crawford _____ 260—647 X

OTHER REFERENCES

Banks et al.: Proc. Chem. Soc. (London), February 1961, pp. 64–65.

Taylor et al.: J. Org. Chem., vol. 27, pp. 1064 to 1066 (1962).

BENJAMIN R. PADGETT, *Acting Primary Examiner.*

L. A. SEBASTIAN, *Assistant Examiner.*